United States Patent [19]
Muramatsu

[11] Patent Number: 6,059,275
[45] Date of Patent: May 9, 2000

[54] VIBRATION DAMPER HAVING OSCILLATING FORCE GENERATING MEANS

[75] Inventor: Atsushi Muramatsu, Komaki, Japan

[73] Assignee: Tokai Rubber Industries, Ltd., Japan

[21] Appl. No.: 08/892,172

[22] Filed: Jul. 14, 1997

[30] Foreign Application Priority Data

Jul. 16, 1996 [JP] Japan ................................. 8-185926

[51] Int. Cl.$^7$ ........................................................ F16F 5/00
[52] U.S. Cl. ........................................................ 267/140.14
[58] Field of Search ........................ 267/140.14, 140.15, 267/140.13, 219, 140.11, 35, 292; 248/562, 636, 634

[56] References Cited

U.S. PATENT DOCUMENTS

| 4,650,170 | 3/1987 | Fukushima | 267/140.14 |
| 5,333,846 | 8/1994 | Goto et al. | 267/140.14 |
| 5,344,129 | 9/1994 | Ide et al. | 267/140.14 |
| 5,388,812 | 2/1995 | Kojima et al. | 267/140.14 |
| 5,427,362 | 6/1995 | Schilling et al. | |
| 5,529,295 | 6/1996 | Leibach et al. | |
| 5,718,417 | 2/1998 | Aoki | 267/140.14 |
| 5,779,231 | 7/1998 | Okazaki et al. | 267/140.14 |

FOREIGN PATENT DOCUMENTS

| 61-220925 | 10/1986 | Japan . |
| 2-21462 | 5/1990 | Japan . |
| 3-292219 | 12/1991 | Japan . |

Primary Examiner—Paul N. Dickson
Assistant Examiner—Melanie Talavera
Attorney, Agent, or Firm—Wall Marjama Bilinski & Burr

[57] ABSTRACT

A vibration damper including: a mounting member secured to a subject body; a first mass member which is displaceable relative to the mounting member in a direction of an input vibration of the subject body; a first elastic member elastically connecting the first mass member to the mounting member; a second mass member which is displaceable relative to the mounting member and the first mass member in the direction of the input vibration of the subject body; a second elastic member elastically connecting the second mass member to the first mass member; a member for generating an oscillating force as a force of relative displacement between the first mass member and the second mass member in the direction of the input vibration of the subject body; and a fluid chamber filled with a non-compressible fluid, the fluid chamber being partially defined by the first elastic body and the second elastic body and disposed between the mounting member and the second mass member.

11 Claims, 4 Drawing Sheets

VIBRATION DAMPER HAVING OSCILLATING FORCE GENERATING MEANS

The present application is based on Japanese Patent Application No. 8-185926 filed Jul. 16, 1996, the content of which is incorporated hereinto by reference.

BACKGROUND OF THE INVENTION

1. Field of the Art

The present invention relates to a vibration damper installed on a subject body for reducing vibration of the subject body. More particularly, the present invention is concerned with such a vibration damper having oscillating force generating means therein.

2. Discussion of the Related Art

As means for damping or reducing vibration of a subject body such as a vehicle body which is subject to vibration, a dynamic damper is widely known. In recent years, for obtaining a further improved vibration damping or reducing effect, JP-A-61-220925 and JP-A-3-292219 propose an active-type vibration damper which is adapted to reduce or control the vibration of the subject body by applying, to the subject body, an oscillating force generated by an actuator.

In the conventional dynamic damper, it is extremely difficult to obtain a desired damping effect when the frequency of the vibration to be damped changes depending upon various factors. For example, a body of an automotive vehicle is subject to various kinds of vibrations depending upon changes in the engine rotating speed and running speed of the vehicle. Further, the dynamic damper which functions as a secondary vibration system is adapted to reduce the vibration of the subject body as a primary vibration system, by absorbing the vibration energy of the subject body. Thus, the conventional dynamic damper is not satisfactory for assuring a high vibration damping effect.

In the active-type vibration damping device, it is required to employ an actuator capable of generating an oscillating force which is large enough to assure a high damping effect. However, where the subject body has a large size and a high rigidity as in the case of a vehicle body, the energy of the vibration of the subject body is accordingly large. In this case, the actuator tends to be large-sized, and the electric power consumed by the actuator is inevitably increased. In addition, it is difficult to apply a sufficient oscillating force to the large and highly rigid subject body. Thus, the conventional active-type vibration damping device is not always satisfactory in its damping effect.

SUMMARY OF THE INVENTION

It is therefore an object of the invention to provide a vibration damper which is compact in size and novel in construction and which is capable of applying a sufficiently large oscillating force to the subject body with a small amount of energy while exhibiting a satisfactory vibration damping effect with respect to vibrations in different frequency bands or over a relatively wide frequency range.

The above object may be attained according to the principle of the present invention, which provides a vibration damper comprising: (a) a mounting member secured to a subject body; (b) a first mass member which is displaceable relative to the mounting member in a direction of an input vibration of the subject body; (c) a first elastic member elastically connecting the first mass member to the mounting member; (d) a second mass member which is displaceable relative to the mounting member and the first mass member in the direction of the input vibration of the subject body; (e) a second elastic member elastically connecting the second mass member to the first mass member; (f) means for generating an oscillating force as a force of relative displacement between the first mass member and the second mass member in the direction of the input vibration of the subject body; and (g) a fluid chamber filled with a non-compressible fluid, the fluid chamber being partially defined by the first elastic body and the second elastic body and disposed between the mounting member and the second mass member.

In the vibration damper constructed as described above, the first mass member is elastically supported by and connected to the mounting member through the first elastic member, so as to constitute a first vibration system, while the second mass member is elastically supported by and connected to the mounting member through a spring provided by the fluid chamber, so as to constitute a second vibration system. Since the force generated by the means for generating the oscillating force acts between the first and second mass members as the force of relative displacement therebetween, the oscillating force is transmitted to the mounting member, and accordingly to the subject body via the first and second vibration systems.

According to this arrangement, the respective resonance frequencies of the first and second vibration systems are suitably tuned, making it possible to amplify or increase the oscillating force in the respective resonance frequency ranges of the first and second vibration systems owing to the resonances of the two vibration systems. Thus, the present vibration damper is capable of applying a sufficiently large oscillating force to the subject body in the respective two resonance frequency ranges of the first and second vibration systems.

The thus formed vibration damper may be employed in an active-type vibration damping device, to apply a sufficiently large oscillating force to the subject body, with a given amount of the energy to be supplied to the damping device. Accordingly, the present invention exhibits an excellent vibration damping effect owing to the use of the oscillating force generating means whose output, size and energy consumption are relatively small.

In a first preferred form of the present invention, the first mass member includes a ring portion formed at an axial end thereof on the side of the mounting member, the first elastic member connecting an axially end portion of the ring portion and the mounting member to each other, while the second mass member includes a working portion formed at an axial end thereof on the side of the mounting member and disposed within the ring portion of the first mass member, such that the working portion is opposed to the mounting member, the second elastic member connecting an outer peripheral portion of the working portion and the ring portion to each other, so that the fluid chamber is defined between the working portion of the second mass member and the mounting member.

In the vibration damper according to the first preferred form of the present invention, the first and second mass members and the first and second elastic members are disposed with high efficiency of space utilization, so as to form the fluid chamber between the mounting member and the second mass member. Thus, the present vibration damper can be made simple in construction and small in size.

According to a second preferred form of the present invention, the vibration damper has a first vibration system constituted by a first mass system which includes the first mass member and a first spring system including the first elastic member, and a second vibration system constituted by a second mass system which includes the second mass member and a second spring system including a spring provided by the fluid chamber. In this vibration damper, the first vibration system has a resonance frequency which is lower than that of the second vibration system.

In the second preferred form of the present invention, the oscillating force generated by the oscillating force generating means is amplified in the respective resonance frequency ranges of the two vibration systems which are tuned differently from each other, owing to the resonances of the first and second vibration systems. The thus amplified oscillating force is transmitted to the mounting member, so that the vibration damper is capable of exhibiting an excellent vibration damping effect. This arrangement is particularly advantageous in that the vibration of the first vibration system acting on the mounting member is limited in the resonance frequency range of the second vibration system which is lower than that of the first vibration system. Accordingly, the oscillating force amplified by the resonance of the second vibration system is efficiently transmitted to the subject body not only via the spring provided by the fluid chamber, but also via a transmission path of the oscillating force which is constituted by the second elastic member, first mass member and first elastic member, whereby the vibration damper assures an excellent vibration damping effect.

According to a third preferred form of the present invention, at least one of the first and the second elastic members consists of a rubber elastic body.

In the above third preferred form of the invention, advantageously, the spring constituting a part of the spring system through which the mass system including the second mass member is elastically connected to the mounting member, can be effectively provided by the fluid chamber. Further, the spring constant of the spring system can be easily tuned.

In a fourth preferred form of the present invention, the means for generating the oscillating force is frequency-variable oscillating force generating means capable of adjusting a frequency of the force of relative displacement generated between the first mass member and the second mass member.

The vibration damper constructed according to the fourth preferred form of the invention is capable of effectively applying the oscillating force to the subject body even where the frequency of the vibration to be damped changes. Especially when the first vibration system including the first mass member and the second vibration system including the second mass member are tuned to the respective different resonance frequencies, the frequency of the displacement force generated by the oscillating force generating means can be made equal to each of the resonance frequencies of the above-indicated two vibration systems, whereby the resonances of the two vibration systems can be utilized to enable the vibration damper to exhibit the desired damping effects with respect to the vibrations to be damped. Further, when the above-indicated two vibration systems are tuned to the respective different resonance frequency bands, the oscillating force is amplified also in a frequency band between the two resonance frequency ranges, based on the resonance of each of the two vibration systems. Accordingly, with the continuous variation of the frequency of the displacement force generated by the oscillating force generating means, the vibration damper exhibits a high damping effect over a wide range of the vibration frequency.

In a fifth preferred form of the present invention, the means for generating the oscillating force is electromagnetic drive means for generating an electromagnetic force between the first mass member and the second mass member.

In the vibration damper constructed according to the fifth preferred form of the invention, the relative displacement force acts on the first and second mass members while avoiding mutual contact of the two mass members, thereby advantageously permitting relative displacement of the two mass members. Further, since the electromagnetic drive means is employed as the oscillating force generating means, the electric power to be supplied to the electromagnetic drive means is controlled so as to easily adjust the amplitude and frequency of the relative displacement force acting on the first and second mass members, so that the oscillating force can be controlled as desired.

In one advantageous arrangement of the fifth preferred form of the present invention, the electromagnetic drive means includes a permanent magnet attached to one of the first and second mass members, so as to form a magnetic gap defining a magnetic path, and a coil attached to the other of the first and second mass members, such that the coil is disposed in the magnetic gap, so that the electromagnetic drive means generates the electromagnetic force between the first and second mass members upon energization of the coil.

In the vibration damper constructed according to the above arrangement, the substantially closed magnetic gap defining the magnetic path is formed in the first mass member, and the coil attached to the second mass member is disposed in the magnetic gap. This arrangement provides a high magnetic flux density in the area where the coil is disposed, so that the relative displacement force is generated between the first and second mass members with high efficiency. By adjusting the amount and frequency of the current to be applied to the coil, the relative displacement force generated between the first and second mass members is easily controlled.

In the vibration damper of the above advantageous arrangement of the fifth preferred form of the invention, the resonance frequency of the first vibration system which includes the first mass member can be tuned to a relatively low frequency by utilizing the mass of the members for forming the magnetic path. Thus, the present vibration damper exhibits a high vibration damping effect with respect to the vibrations of a large oscillating force, such as engine idling vibrations transmitted to a vehicle body.

In a sixth preferred form of the present invention, the vibration damper comprises a flexible diaphragm partially defining an equilibrium chamber which is filled with the non-compressible fluid and whose volume is variable, and an orifice passage f or fluid communication therethrough between the equilibrium chamber and the fluid chamber.

In the vibration damper according to the sixth preferred form of the invention, the oscillating force to be applied to the subject body can be adjusted by utilizing the resonance of the fluid which is forced to flow through the orifice passage, leading to a higher degree of freedom in tuning the vibration damping characteristics of the vibration damper.

In a seventh preferred form of the present invention, the equilibrium chamber is formed within the mounting member.

In the vibration damper according to the seventh preferred form of the invention, the equilibrium chamber is formed by effectively utilizing a space in the damper, so as to reduce or avoid an increase in the size of the vibration damper.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

Figure 1:
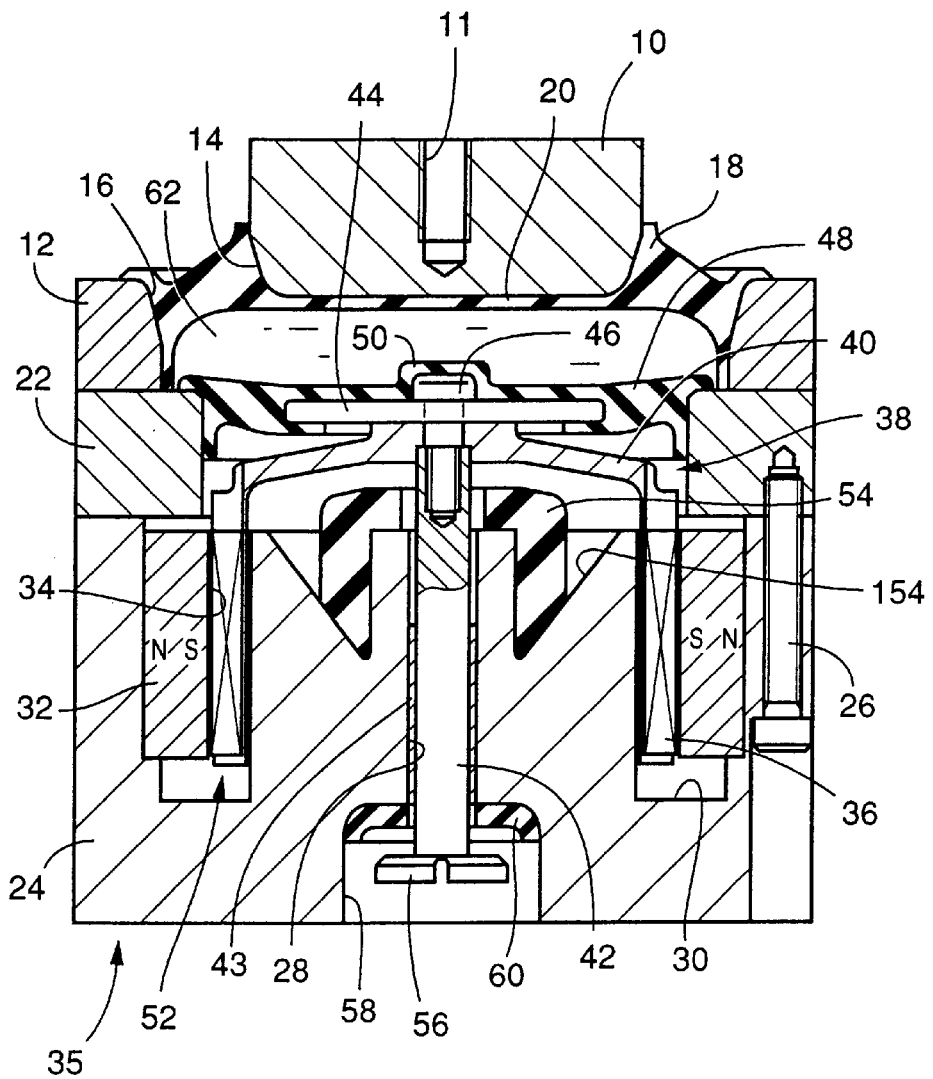
FIG. 1 is an elevational view in longitudinal cross section of a vibration damper constructed according to one embodiment of the present invention.

Referring first to FIG. 1, there is shown a vibration damper constructed according to one embodiment of the present invention. The vibration damper includes a mounting member 10 which is made of a metallic material and has a circular shape and a relatively large thickness. In one of the opposite surfaces (i.e., axially upper surface) of the mounting member 10, there is formed a mounting hole 11 open at a central portion thereof. The mounting member 10 is directly secured, by a mounting bolt (not shown) screwed in the mounting hole 11, to a subject body whose vibrations are to be damped.

Radially outwardly of the mounting member 10, there is disposed a connecting member 12 which is an annular metallic member. The connecting member 12 is spaced apart from the mounting member 10 by a suitable radial distance. The mounting member 10 has a tapered outer circumferential surface 14 at its axially lower portion while the connecting member 12 has a tapered inner circumferential surface 12 at its axially upper portion. The connecting member 12 is disposed axially downwardly of the mounting member 10 by a suitable axial distance, such that the tapered outer circumferential surface 14 of the mounting member 10 and the tapered inner circumferential surface 16 of the connecting member 12 are opposed to each other in the radial direction with a first elastic member in the form of a first elastic body 18 interposed therebetween. The mounting and connecting members 10, 12 are elastically connected to each other by the first elastic body 18 interposed therebetween. Described more specifically, the first elastic body 18 is a generally tapered cylindrical member. In the process of vulcanization of a rubber material of the first elastic body 18, the mounting member 10 is bonded at its tapered outer circumferential surface 14 to the inner circumferential surface of the small-diameter end portion of the first elastic body 18, while the connecting member 12 is bonded at its tapered inner circumferential surface 16 to the outer circumferential surface of the large-diameter end of the first elastic body 18, to thereby provide an integral assembly. The axially lower surface of the mounting member 10 is covered with a thin rubber layer 20 which is integrally formed with the first elastic body 18.

On the axially lower surface of the connecting member 12, there is superposed a support member 22 in the form of an annular block. The support member 22 is fixed to the connecting member 12 by means of a bolt (not shown). On the axially lower surface of the support member 22, there is superposed a yoke 24 made of a ferromagnetic material such as iron. The yoke 24 is fixed to the support member 22 by bolts 26. The yoke 24 is a generally circular block member and has a through-hole 28 formed at its central portion so as to extend in the axial direction through the thickness thereof. The yoke 24 further has an annular groove 30 formed at a radially intermediate portion thereof, so as to continuously extend in the circumferential direction of the yoke 24. The annular groove 30 is open in the axially upper surface of the yoke 24. A permanent magnet 32 is accommodated in the annular groove 30, and is bonded to the outer circumferential surface of the groove 30. The permanent magnet 32 may consist of either a single cylindrical member or a plurality of members arranged in the circumferential direction. The permanent magnet 32 used in the present invention has one magnetic pole adjacent to its outer circumferential surface which is held in close contact with the outer circumferential surface of the groove 30 and another magnetic pole adjacent to its inner circumferential surface which is opposed to the inner circumferential surface of the groove 30 with a suitable radial spacing therebetween. Owing to the presence of the yoke 24, there is formed a substantially closed magnetic path which extends from one magnetic pole of the permanent magnet 32 to the other magnetic pole. In the thus formed magnetic path, an annular magnetic gap 34 is formed between the inner circumferential surface of the permanent magnet 32 and the inner circumferential surface of the groove 30, so as to extend in the circumferential direction of the groove 30.

The connecting member 12, support member 22 and yoke 24 to which the permanent magnet 32 is bonded are integrally secured to one another, so as to constitute a first mass 35 as a substantially unitary body. The first mass 35 is elastically connected to the mounting member 10 through the first elastic body 18. In the present embodiment, the connecting member 12 and the support member 22 each in the form of the annular block cooperate with each other to constitute a ring portion of the first mass 35, which ring portion is located at an axially upper end of the first mass 35 on the side of the mounting member 10.

In the groove 30 of the yoke 24, there is accommodated a coil 36 which is wound in the circumferential direction of the groove 30, such that the coil 36 is disposed within the annular magnetic gap 34. A bobbin 38 of the coil 36 has an inverted-cup shape which consists of a cylindrical wall and a bottom wall 40. The coil 36 is wound on the outer circumferential surface of the cylindrical wall of the bobbin 38. The bobbin 38 is assembled with the yoke 24 such that the cylindrical wall of the bobbin 38 is inserted in the groove 30 of the yoke 24 while the bottom wall 40 is located axially upwardly of the yoke 24 so as to protrude from the axially upper surface of the yoke 24 in which the groove 30 is open.

The inside diameter of the bobbin 38 is determined so as to provide a slight clearance between the inner circumferential surface of the cylindrical wall of the bobbin 38 and the inner circumferential surface of the groove 30 which defines the inside diameter of the magnetic gap 34. The outside diameter of the bobbin 38 is determined so as to provide a slight clearance between the outer circumferential surface of the cylindrical wall of the bobbin 38 and the inner circumferential surface of the permanent magnet 32 which defines the outside diameter of the magnetic gap 34. To the central portion of the axially lower surface of the bottom wall 40 of the bobbin 38, a guide pin 42 is secured by a bolt. The guide pin 42 is inserted into the through-hole 28 of the yoke 24, such that it is axially slidable on the inner circumferential surface of a sliding sleeve 43 which is fitted in the through-hole 28. This arrangement permits axial movements of the bobbin 38 without radial movements thereof, so that the cylindrical wall of the bobbin 38 on which the coil 36 is wound is smoothly movable in the axial direction within the magnetic gap 34 of the yoke 24.

The bottom wall 40 of the bobbin 38 disposed axially upwardly of the yoke 24 has a boss portion formed at the central portion of the axially upper surface thereof. To this boss portion of the bottom wall 40, an oscillating plate 44 formed of a rigid material such as metal and having a circular shape is coaxially fixed by a bolt 46. The oscillating plate 44 has an outside diameter which is smaller than an inside diameter of the support member 22 by a suitable amount. The oscillating plate 44 is disposed in a central hole of the annular support member 22, such that it is located axially downwardly of the mounting member 10 so as to oppose to the mounting member 10 with a suitable axial distance therebetween. In an annular radial space between the oscillating plate 44 and the support member 22, there is disposed a second elastic member in the form of a second elastic body 48 so as to elastically connect the oscillating plate 44 and support member 22 to each other. Described in detail, the second elastic body 48 is a generally annular plate, and is bonded at its outer circumferential surface to the inner circumferential surface of the support member 22 and at its inner circumferential surface to the outer circumferential surface of the oscillating plate 44, during vulcanization process of a rubber material of the second elastic body 48, so as to provide an integral assembly. Thus, the oscillating plate 44 is elastically supported by the support member 22 through the second elastic body 48. The axially upper surface of the oscillating plate 44 is covered with a thin rubber layer 50 which is integrally formed with the second elastic body 48.

According to the arrangement as described above, the bobbin 38 on which the coil 36 is wound, oscillating plate 44, guide pin 42 and bolt 46 are integrally connected to one another, so as to constitute a second mass 52 as a substantially unitary body. The second mass 52 is elastically connected to the support member 22 of the first mass 35 through the second elastic body 48. In the present embodiment, the oscillating plate 44 serves as a working portion of the second mass 52 which is opposed to the mounting member 10.

On the axially upper surface of the yoke 24, a rubber stop member 54 is provided such that the stop member 54 is fitted in a groove 154 formed around the through-hole 28. The bobbin 38 is brought into an abutting contact with the yoke 24 via the rubber stop member 54, so as to limit an amount of relative displacement of the first mass 35 and second mass 52 in a direction toward each other. The guide pin 42 secured to the bobbin 38 has an abutting part 56 formed at its free end and having a larger diameter than the through-hole 28. The abutting part 56 of the guide pin 42 is accommodated in a recess 58 formed on the axially lower surface of the yoke 24, and is opposed to the bottom wall of the recess 58 with a suitable axial distance therebetween. The abutting part 56 is brought into an abutting contact with the bottom wall of the recess 58 via a rubber buffer 60 provided on the bottom wall of the recess 58, so as to limit an amount of relative displacement of the first mass 35 and second mass 52 in a direction away from each other.

Between the axially lower surface of the mounting member 10 and the axially upper surface of the oscillating plate 44 which are opposed to each other in the axial direction, there is formed a fluid chamber 62 which is filled with a suitable non-compressible fluid. The fluid chamber 62 is partially defined by the mounting member 10, oscillating plate 44, first elastic body 18 and second elastic body 48, and is located in a central hole of the annular connecting member 12. The non-compressible fluid filling the fluid chamber 62 is not particularly limited, and may be preferably selected from among water, alkylene glycol, polyalkylene glycol and silicone oil, for instance. The non-compressible fluid preferably has a viscosity of not higher than 0.1 Pa.s, particularly when it is desired to improve its function of transmitting a force of oscillation of the oscillating plate 42 in a high frequency range.

In the vibration damper constructed as described above, an electromagnetic force is generated in relation to a magnetic field in the magnetic gap 34 upon energization of the coil 36, so as to cause a relative displacement between the yoke 24 and the coil 36, and accordingly, between the first mass 35 and the second mass 52. Especially when the coil 36 is energized by application of a pulsating current or an alternating current thereto, there is generated a relative reciprocatory displacement force, i.e., an oscillating force, between the first mass 35 and the second mass 52 in the axial direction, in cooperation with the elasticity of the second elastic body 48. By adjusting the frequency and amount of the current to be applied to the coil 36, it is possible to control the frequency and amplitude of the oscillating force generated between the first and second masses 35, 52. It will be apparent from the above description that means for forming the magnetic field, which comprises the permanent magnet 32 and the yoke 24 of the first mass 35, cooperate with an energizing member which comprises the coil 36 of the second mass 52 to constitute means for generating the electromagnetic force between the first mass 35 and the second mass 52.

Figure 2:
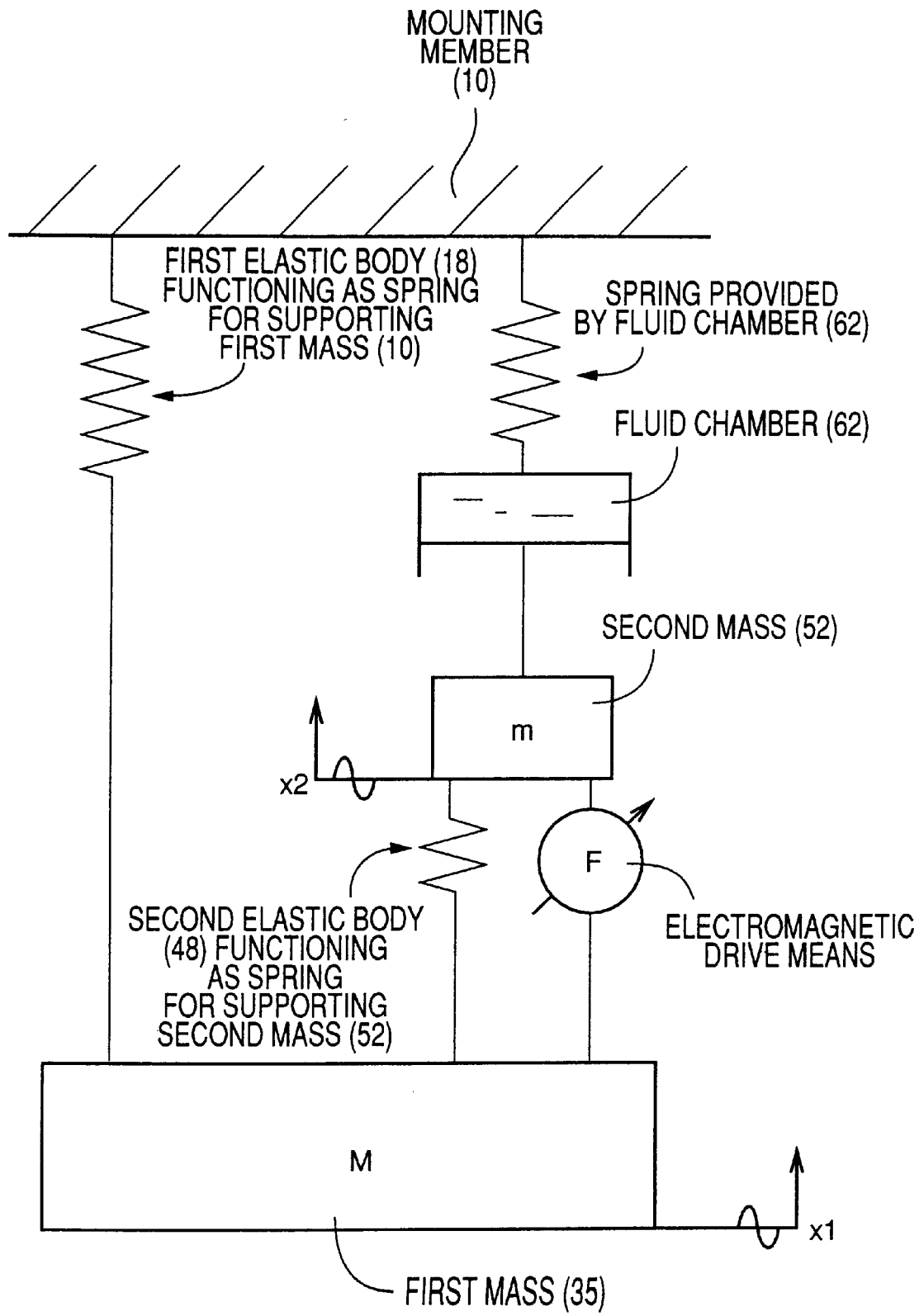
FIG. 2 is a view schematically showing the vibration systems of the damper of FIG. 1.

As is clear from FIG. 2 schematically showing the vibration damper of the present embodiment, the first mass 35 is elastically supported by and connected to the mounting member 10 through a first spring system which includes: a spring consisting of the first elastic body 18; a spring provided by the fluid chamber 62; and a spring consisting of the second elastic body 48. Thus, a first vibration system is formed. On the other hand, the second mass 52 is elastically supported by and connected to the mounting member 10 and the first mass 35 through a second spring system including the spring of the fluid chamber 62 and spring of the second elastic body 48. Thus, a second vibration system is formed. Upon energization of the coil 36, the oscillating force F is generated between the first and second masses 35, 52. The spring provided by the fluid chamber 62 represents spring characteristics which permit deformation of the fluid chamber 62, based principally on the elasticity of the first and second elastic bodies 18, 48.

Each of the first and second vibration systems as described above has an intrinsic resonance frequency depending upon the mass of each of the first and second masses 35, 52 and the spring constant of each spring system. In the present embodiment, the resonance frequency of the first vibration system is made lower than that of the second vibration system, since the first vibration system includes the yoke 24 and permanent magnet 32 having relatively large mass.

In the vibration damper constructed as described above, when the coil 36 is activated by application of an alternating current thereto, the oscillating force F is generated between the first mass 35 and the second mass 52 in the axial direction. When the frequency of the current applied to the coil 36 is in the resonance frequency range of the first vibration system, the first vibration system resonates so as to increase the amplitude x1 and vibration acceleration x1" of the first mass 35. Accordingly, the vibration of the first mass 35 is transmitted to the mounting member 10 via the first spring system as described above, so that the oscillating force F is increased, acting on the subject body, so as to damp the vibration thereof. When the frequency of the current applied to the coil 36 is in the resonance frequency range of the second vibration system, the amplitude x1 and vibration acceleration x1" of the first mass 35 become small while, on the other hand, the amplitude x2 and vibration acceleration x2" of the second mass 52 are increased. Accordingly, the vibration of the second mass 52 is transmitted to the mounting member 10 via the second spring system and the first vibration system (including the first mass 35 and the first spring system) which is in the substantially stationary state, so that the large oscillating force acts on the subject body.

In the present embodiment, owing to the resonances of the first and second vibration systems, the oscillating force F is effectively increased also in a frequency range between the resonance frequency range of the first vibration system and the resonance frequency range of the second vibration system. Thus, the present arrangement permits effective application of the oscillating force to the mounting member 10, and accordingly to the subject body.

The vibration damper constructed according to the present invention is installed on a suitable portion of the subject body such as a vehicle body, for applying a large oscillating force to the subject body. Thus, the present vibration damper is capable of advantageously assuring the effect of reducing or controlling the vibration of the subject body. By adjusting the frequency of the current to be applied to the coil 36, it is possible to apply a large oscillating force to the subject body over a wide frequency range between the respective two resonance frequency ranges of the first and second vibration systems. Accordingly, the present vibration damper exhibits an excellent vibration damping effect with respect to the various kinds of input vibrations over a wide frequency range.

In the vibration damper according to the present invention, the frequency ranges in which large oscillating force is generated are easily determined or changed, by adjusting the mass of the first and second masses 35, 52, spring characteristics of the first and second elastic bodies 18, 48 and resonance frequencies of the first and second vibration systems. Accordingly, the present vibration damper can be easily tuned in view of the desired damping characteristics, and the present damper is advantageously employed in various types of the subject body.

The vibration damper constructed according to the present invention permits generation of large oscillating force by utilizing resonances of the first and second vibration systems. This arrangement makes it possible to apply an effective oscillating force to the subject body by using small-sized electromagnetic drive means with application of a relatively small amount of current, leading to reduction in size and weight of the damper and reduction in energy (current) to be consumed by the damper.

The present vibration damper employs voice-coil type electromagnetic drive means (VCM type), thereby stably generating a large oscillating force between the first and second masses 35, 52, with a relatively large amplitude of oscillation, for providing excellent vibration damping characteristics.

Figure 3:
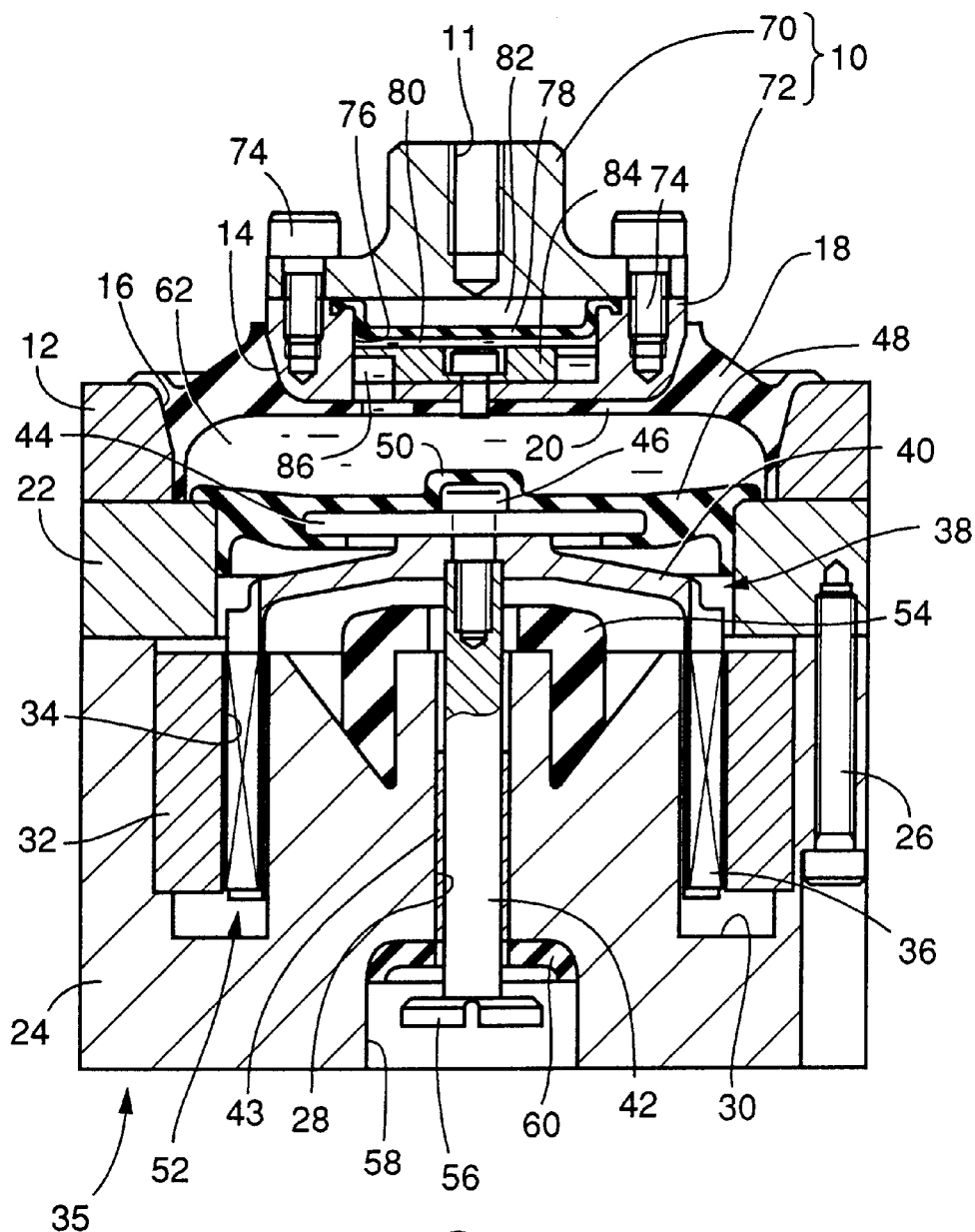
FIG. 3 is an elevational view in longitudinal cross section of a vibration damper constructed according to another embodiment of the present invention.

Referring next to FIG. 3, there is shown a vibration damper constructed according to a second embodiment of the present invention. The vibration damper of this second embodiment is different from the vibration damper of the preceding first embodiment in that the damper of the second embodiment has an orifice passage as means for tuning the vibration damping characteristics. In this second embodiment, the same reference numerals as used in the first embodiment are used to identify the corresponding components, and detailed explanation of which is dispensed with.

In the vibration damper of FIG. 3, the mounting member 10 consists of two separate members, i.e., an upper plate 70 and a lower plate 72. These upper and lower plates are superposed on each other in the axial direction, and fixed to each other by bolts 74, to thereby constitute the mounting member 10. The lower plate 72 has a circular recess 76 which is formed at its central portion and open in the axially upper surface thereof. The opening of the circular recess 76 is closed by the upper plate 70 so as to define an enclosed space within the mounting member 10 consisting of the upper and lower plates 70, 72.

Within the enclosed space of the mounting member 10, a thin flexible rubber layer 78 having a circular shape is accommodated. The outer peripheral portion of the flexible rubber layer 78 is fluid-tightly gripped by and between the upper and lower plates 70, 72, whereby the enclosed space of the mounting member 10 is fluid-tightly divided by the rubber layer 78 into two sections located on the side of the bottom of the recess 76 and on the side of the opening of the recess 76, respectively. According to this arrangement, an equilibrium chamber 80 filled with a suitable non-compressible fluid is formed between the rubber layer 78 and the bottom of the circular recess 76, while an air chamber 82 with a suitable volume is formed on one of the opposite sides of the rubber layer 78 remote from the equilibrium chamber 80. Described in detail, the equilibrium chamber 80 is partially defined by the rubber layer 78 whose displacement is permitted by the air chamber 82, so that the volume of the equilibrium chamber 80 is variable based on the displacement of the rubber layer 78.

To the inner surface of the bottom wall of the lower plate 72 which defines the bottom of the circular recess 76, there is bolted an orifice defining member 84 having a circular shape. The orifice defining member 84 and the bottom wall of the lower plate 72 which defines the bottom of the circular recess 76 cooperate with each other to define an orifice passage 86 which extends over a suitable circumferential length at the outer peripheral portion of the circular recess 76. The orifice passage 86 communicates at one end thereof with the fluid chamber 62 through the bottom wall of the lower plate 72 and at the other end with the equilibrium chamber 80 through the orifice defining member 84. In this arrangement, the non-compressible fluid is permitted to flow between the fluid chamber 62 and the equilibrium chamber 80 through the orifice passage 86.

In the vibration damper constructed as described above, when the oscillating force is generated between the first mass 35 and the second mass 52 by energization of the coil 36, the pressure of the fluid in the pressure chamber 62 is varied due to the vibrations of the first and second vibration systems, so that the fluid is forced to flow between the fluid chamber 62 and the equilibrium chamber 80 through the orifice passage 86 due to a pressure difference between the two chambers 62, 80.

Thus, the vibration damper of this embodiment which utilizes the resonance of the fluid which is forced to flow through the orifice passage 86 has a higher degree of freedom in tuning the vibration characteristics of the first and second vibration systems and the vibration damping characteristics of the damper.

While the present invention has been described in its presently preferred embodiments, it is to be understood that the invention is not limited to the details of the illustrated embodiments, but may be otherwise modified.

As means for generating the oscillating force between the first mass 35 and the second mass 52, it is possible to employ electromagnetic drive means other than the VCM type used in the illustrated embodiments, or employ oscillating force generating means other than the electromagnetic drive means. Where the second mass 52 is returned to its original position by the elasticity of the second elastic body 48 as in the illustrated embodiments, it is possible to employ oscillating force generating means which is adapted to permit displacement of the second mass 52 only in one of the opposite axial directions.

In the illustrated embodiments, the elastic body is used as each of the first and second elastic members. However, other elastic members such as a sheet spring may be employed as the first and second elastic members.

Although the vibration damper of the illustrated second embodiment has one orifice passage 86, two or more orifice passages may be formed. In this case, the orifice passages are selectively rendered operative, so as to assure a higher degree of freedom in tuning the vibration damping characteristics of the damper.

The resonance frequency of the second mass member which is elastically supported by and connected to the first mass member through the second elastic member may be determined to be in a lower frequency range than the resonance frequency of the first mass member which is elastically supported by and connected to the mounting member through the first elastic member.

While the illustrated embodiments of the invention take form of a vibration damper adapted to apply an oscillating force to the desired subject body, it is to be understood that the principle of the invention is applicable to other types of vibration damper functioning as a dynamic damper adapted to reduce the vibration energy of the subject body.

EXAMPLE

The frequency characteristics of the oscillating force were actually measured in a vibration damper constructed according to the first embodiment of the present invention, upon energization of the coil (36) by application of an alternating current of 1A. In this vibration damper, the mass of the first mass (35) is 2.2 kg and the spring constant of the first spring system is 600 N/mm, so that the first vibration system has the resonance frequency fn of 83 Hz, while the mass of the second mass (52) is 0.16 kg and the spring constant of the second spring system is 300 N/mm, so that the second vibration system has the resonance frequency fn of 218 Hz. The result is shown in the graph of FIG. 4.

As a comparative example 1, a vibration damper was produced which is identical in construction with the vibration damper of the above example, except that the fluid chamber (62) of the damper of the comparative example 1 was not filled with the non-compressible fluid. The frequency characteristics of the oscillating force were measured in this damper of the comparative example 1 under the same conditions as in the above example. The result is also indicated in FIG. 4.

As a comparative example 2, the frequency characteristics of the oscillating force were measured of the electromagnetic drive means per se, which is identical in construction with the electromagnetic drive means of the damper in the above example according to the present invention. Namely, this electromagnetic drive means of the comparative example 2 was obtained by removing, from the vibration damper used in the above example, the integral assembly including the mounting member 10 and connecting member 12 connected to each other by the first elastic body 18. The frequency characteristics of the oscillating force generated between the first mass 35 and the second mass 52 were measured upon energization of the coil 36 by application of the alternating current of 1A. The result is also shown in FIG. 4.

Figure 4:
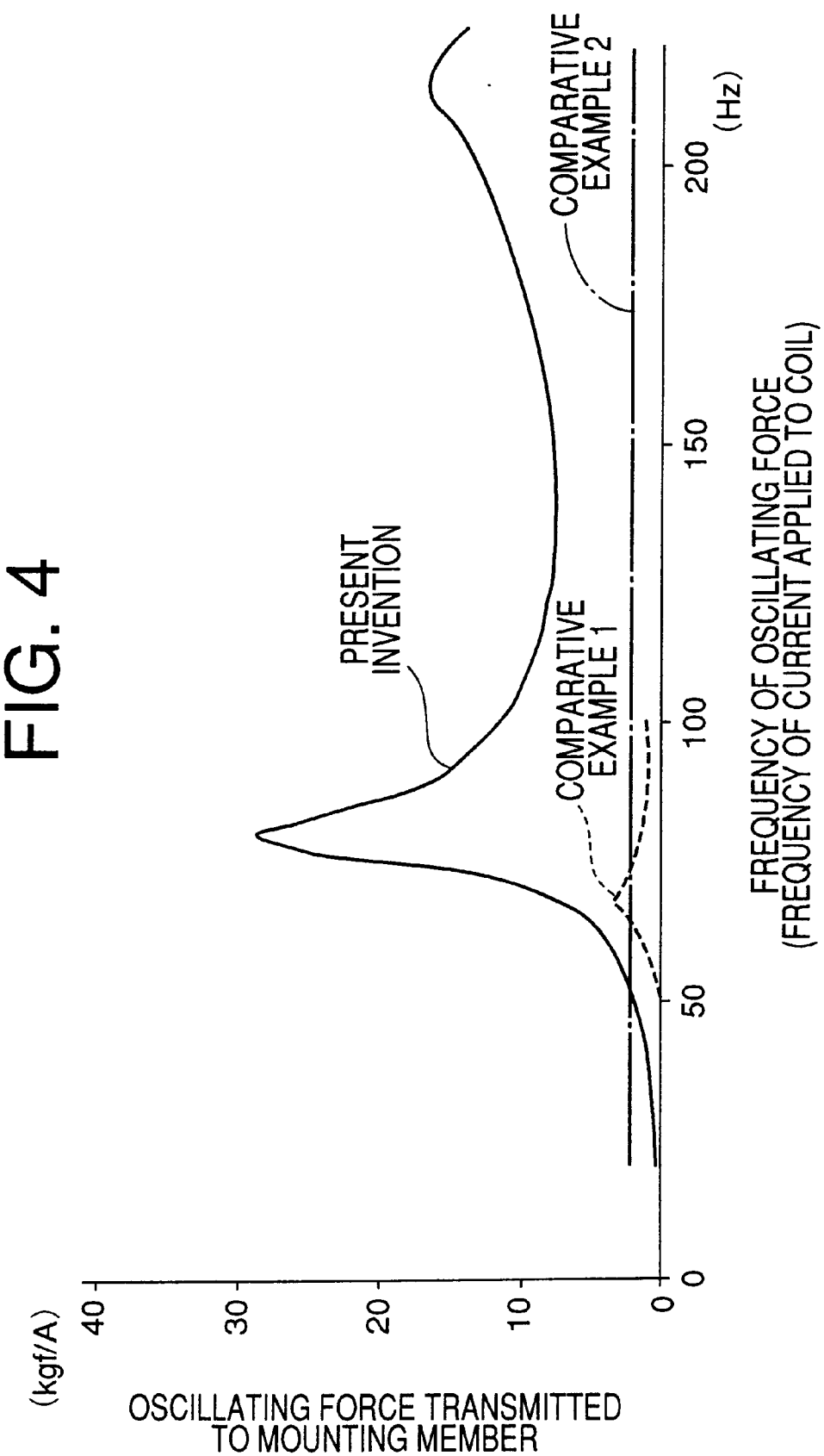
FIG. 4 is a graph showing frequency characteristics of an oscillating force measured in the damper of the present invention, together with those measured in dampers according to comparative examples.

As is apparent from the results of FIG. 4, the vibration damper according to the present invention is capable of applying, to the subject body, the oscillating force several times as large as the oscillating force generated in the electromagnetic drive means of the comparative example 2, over a wide frequency range from the resonance frequency range of the first vibration system to the resonance frequency range of the second vibration system. Thus, the present vibration damper assures excellent vibration damping characteristics.

It will be clear from the above description that the vibration damper constructed according to the present invention is capable of amplifying the oscillating force to be applied to the subject body by the oscillating force generating means, in both resonance frequency ranges of the first and second vibration systems. Accordingly, the present vibration damper assures effective vibration damping characteristics while avoiding increase in the size of the oscillating force generating means and the energy to be consumed.

What is claimed is:

1. A vibration damper comprising:

a mounting member secured to a subject body;

a first mass member which is displaceable relative to said mounting member in a direction of an input vibration of said subject body;

a first elastic member elastically connecting said first mass member to said mounting member;

a second mass member which is displaceable relative to said mounting member and said first mass member in said direction of the input vibration of said subject body;

a second elastic member elastically connecting said second mass member to said first mass member;

means for generating an oscillating force as a force of relative displacement between said first mass member and said second mass member in said direction of the input vibration of said subject body; and a fluid chamber filled with a non-compressible fluid, said fluid chamber being partially defined by said first elastic body and said second elastic body and disposed between said mounting member and said second mass member;

wherein said vibration damper is directly connected to only a single subject body.

2. A vibration damper according to claim 1, wherein said first mass member includes a ring portion formed at an axial end thereof on a side of said mounting member, said first elastic member connecting an axial end portion of said ring portion and said mounting member to each other, while said second mass member includes a working portion formed at an axial end thereof on a side of said mounting member and disposed within said ring portion of said first mass member, such that said working portion is opposed to said mounting member, said second elastic member connecting an outer peripheral portion of said working portion and said ring portion to each other, so that said fluid 62 chamber is defined between said working portion of said second mass member and said mounting member.

3. A vibration damper according to claim 1, wherein a first vibration system is constituted by a first mass system which includes said first mass member and a first spring system including said first elastic member, and a second vibration system is constituted by a second mass system which includes said second mass member and a second spring system including a spring provided by said fluid chamber, said first vibration system having a resonance frequency lower than that of said second vibration system.

4. A vibration damper according to claim 1, wherein at least one of said first and said second elastic members consists of a rubber elastic body.

5. A vibration damper according to claim 1, wherein said means for generating said oscillating force is a frequency-variable oscillating force generating means capable of adjusting a frequency of said force of relative displacement generated between said first mass member and said second mass member.

6. A vibration damper according to claim 1, wherein said means for generating said oscillating force is an electromagnetic drive means for generating an electromagnetic force between said first mass member and said second mass member.

7. A vibration damper according to claim 6, wherein said electromagnetic drive means includes a permanent magnet attached to one of said first and said second mass members, so as to form a magnetic gap defining a magnetic path, and a coil attached to the other of said first and said second mass members, such that said coil is disposed in said magnetic gap, said electromagnetic drive means generating said electromagnetic force between said first and said second mass members upon energization of said coil.

8. A vibration damper according to claim 1, further comprising a flexible diaphragm partially defining an equilibrium chamber which is filled with the non-compressible fluid and whose volume is variable, and an orifice passage for fluid communication therethrough between said equilibrium chamber and said fluid chamber.

9. A vibration damper according to claim 8, wherein said equilibrium chamber is formed within said mounting member.

10. A vibration damper according to claim 1, further comprising a stopper for restricting an amount of relative displacement of said first mass and said second mass in a direction toward each other.

11. A vibration damper according to claim 1, further comprising a stopper for restricting an amount of relative displacement of said first and second mass in a direction away from each other.

* * * * *